US006818888B2

(12) United States Patent
Wells et al.

(10) Patent No.: US 6,818,888 B2
(45) Date of Patent: Nov. 16, 2004

(54) VORTEX FLOW ATMOSPHERIC PRESSURE CHEMICAL IONIZATION SOURCE FOR MASS SPECTROMETRY

(75) Inventors: Gregory J. Wells, Fairfield, CA (US); Steven D. Schachterle, Martinez, CA (US)

(73) Assignee: Varian, Inc., Palo Alto, CA (US)

( * ) Notice: Subject to any disclaimer, the term of this patent is extended or adjusted under 35 U.S.C. 154(b) by 217 days.

(21) Appl. No.: 10/115,684

(22) Filed: Apr. 4, 2002

(65) Prior Publication Data

US 2003/0189169 A1 Oct. 9, 2003

(51) Int. Cl.[7] .................................................. B01D 59/44
(52) U.S. Cl. .................................................. 250/288
(58) Field of Search .................................. 250/281–282, 250/288, 324–325, 423 R, 424–426, 423 F; 422/83; 55/419

(56) References Cited

U.S. PATENT DOCUMENTS 4,070,171 A * 1/1978 Wikdahl ...................... 55/419
5,859,432 A * 1/1999 Kato et al. .................. 250/288
6,177,669 B1 * 1/2001 Wells et al. ................ 250/288
6,236,042 B1 5/2001 Kato et al.
6,252,225 B1 6/2001 Takada et al.
6,294,779 B1 9/2001 Apffel et al.
6,339,218 B1 1/2002 Kato et al.
6,485,689 B1 * 11/2002 Huang et al. ................. 422/83

OTHER PUBLICATIONS

Prior Art Figure 1 from current application (10/115684).*

* cited by examiner

*Primary Examiner*—John R. Lee
*Assistant Examiner*—Christopher M. Kalivoda
(74) *Attorney, Agent, or Firm*—Bella Fishman; David Gloekler

(57) ABSTRACT

An ion source for use in mass spectrometry, and particularly an atmospheric pressure chemical ionization (APCI) source, comprises a chamber having a central axis, a sample conduit that includes a sample outlet communicating with the chamber, an ionizing device disposed downstream from the sample conduit, and a gas conduit that includes a gas outlet communicating with the chamber. The gas conduit defines a flow path directed into the chamber. The flow path includes a velocity component that is tangential with respect to the central axis of the chamber. The gas so directed into the chamber establishes a vortex gas flow therein, forcing the sample emitted from the sample outlet to flow toward the heated wall of the chamber. Vaporization of the sample prior to ionization is consequently improved.

32 Claims, 6 Drawing Sheets

VORTEX FLOW ATMOSPHERIC PRESSURE CHEMICAL IONIZATION SOURCE FOR MASS SPECTROMETRY

FIELD OF THE INVENTION

The present invention generally relates to atmospheric pressure chemical ionization (APCI) mass spectrometry (MS). More particularly, the present invention relates to an apparatus and method for improving vaporization of sample-containing droplets in the APCI source.

BACKGROUND OF THE INVENTION

Mass spectrometry is a highly sensitive method of molecular analysis. In general, mass spectrometry is a technique that produces a mass spectrum by converting the components of a sample into rapidly moving gaseous ions, and resolving the ions on the basis of their mass-to-charge (m/e or m/z) ratios. The mass spectrum can be expressed as a plot of relative abundances of charged components as a function of mass, and thus can be used to characterize a population of ions based on their mass distribution. Mass spectrometry is often performed to determine molecular weight, molecular formula, structural identification, and the presence of isotopes. The apparatus provided for implementing mass spectrometry, i.e., the mass spectrometer (MS), typically consists of a sample inlet system, an ion source, a mass analyzer, and an ion detection system, as well as the components necessary for carrying out signal processing and readout tasks. Many of these functional components of the mass spectrometer, particularly the mass analyzer, are maintained at a low pressure by means of a vacuum system. The ion source converts the components of a sample into charged particles. The negative particles are ordinarily removed from the process flow. The mass analyzer disperses the charged particles based on their respective masses, and then focuses the ions on the detector. The ion currents produced by the detector are then amplified and recorded as a function of spectral scan time. The designs of the components of the mass spectrometer, and the principles by which they operate, can vary considerably. Thus, components of differing designs have distinct advantages and disadvantages when compared to each other, and the desirability of any one design can depend on, among other factors, the nature of the sample to be analyzed.

One type of sample inlet system can be described as being chromatographic—that is, in some types of analytical systems, the effluent from a chromatographic column can be utilized as the sample source for a mass spectrometer. Stated differently, the mass spectrometer in such cases can be considered as serving as the detector for the chromatographic apparatus. Such an arrangement is commercially available in systems in which a gas chromatographic (GC) apparatus is directly coupled to the mass spectrometer (GC/MS systems), or a liquid chromatographic (LC) apparatus is directly coupled to the mass spectrometer (LC/MS systems). These combined systems are particularly useful for deriving complex spectra from mixtures, as it is known that mass spectrometers alone are more or less limited to handling pure compounds and relatively simple mixtures.

An ion source commonly serving as the interface between an LC apparatus and the mass spectrometer operates according to the principle of atmospheric pressure chemical ionization (APCI). Simply stated, APCI is a means for ionizing samples dissolved in a liquid. Typically, the sample-containing liquid emitted from the LC apparatus is pneumatically nebulized into numerous small droplets, typically below 100 microns in diameter. Heat is applied to the droplets to vaporize the liquid and sample matrix, and the resulting vapor is subsequently passed through a low-current corona discharge. In the discharge, ion molecule reactions occur between the charge-neutral sample and the ions formed in the primary discharge. The ion molecule reactions with the sample cause the sample to become charged, and the charged sample ions are passed through an opening in a vacuum chamber into the mass analyzer of the mass spectrometer for mass analysis.

FIG. 1 illustrates an example of a conventional APCI source, generally designated 10, utilized in, for example, an LC/MS system. In general terms, APCI source 10 comprises an inlet section, generally designated 20; a vaporization section, generally designated 30; an ionization section, generally designated 40; and an outlet section, generally designated 50, that includes an aperture 53 through which ionized products are directed into the mass analyzer of the mass spectrometer. For simplicity, the mass analyzer and other typical components of the mass spectrometer, such as its ion detection, signal processing and readout systems, are collectively designated as MS in FIG. 1.

Inlet section 20 comprises a capillary tube 23 that serves as the sample inlet system of the mass spectrometer, and which conducts the LC column flow from a liquid chromatographic apparatus LC. In addition, a length of conduit 27 for directing a suitable nebulizing gas such as nitrogen into vaporization section 30 is coaxially disposed about capillary tube 23. Vaporization section 30 of APCI source 10 generally includes a vaporizing tube 33, a heater 35, and a conduit 37 for directing a suitable vaporizing gas such as nitrogen into vaporizing tube 33. Heater 35 is situated so as to ensure sufficient thermal contact with the wall of vaporizing tube 33. Capillary tube 23 is disposed along the central axis of vaporizing tube 33. A portion of vaporizing gas conduit 37 is coaxially disposed about nebulizing gas conduit 27 as well as capillary tube 23. Ionization section 40 of APCI source 10 generally includes an enclosed chamber (not specifically shown) into which an electrode, designated herein as a corona needle 43, is inserted. Corona needle 43 typically operates at about 5 kV to strike a low-current corona discharge 45 within ionization section 40.

In operation, a liquid sample comprising the LC column flow from liquid chromatographic apparatus LC is introduced into the heated vaporizing tube 33 via capillary tube 23. Nebulizing and vaporizing gas streams are introduced into vaporizing tube 33 through nebulizing gas conduit 27 and vaporizing gas conduit 37, respectively. The nebulizing gas flows concentrically around centrally disposed capillary tube 23 at high velocity flow, thereby nebulizing the liquid sample into small liquid droplets as the nebulizing gas and liquid sample enter vaporizing tube 33. Because the wall of vaporizing tube 33 is heated by heater 35 and consequently transfers heat energy into the interior of vaporizing tube 33, the liquid droplets of the nebulized sample entering vaporizing tube 33 are converted into vapor. The vaporizing gas is added to the system by means of vaporizing gas conduit 37 to assist in transporting the liquid droplet and vapor phases of the sample through vaporizing tube 33. The vapor then passes into the low-current corona discharge 45 established by corona needle 43 in ionization section 40, where the charge-neutral sample is ionized by ion molecule reactions with ions formed in the discharge.

In a typical configuration of conventional APCI source 10, vaporizing tube 33 has a 4-mm internal diameter and is 120–150 mm in length. A 1 ml/min liquid flow of sample-containing liquid corresponds to an approximately 1700 ml/min flow of vapor. The nebulizing gas flows at a rate of approximately 1000 ml/min, and the auxiliary vaporizing gas flows at a rate of approximately 1000–2000 ml/min. Thus, assuming a net gas flow rate of approximately 5000 ml/min through a 4-mm I.D., 120-mm long vaporizing tube 33, a droplet entrained in the gas, moving at the average flow velocity of the gas, would require approximately 15–20 ms to traverse the entire length of vaporizing tube 33. A liquid flow of 1 ml/min of water requires in excess of 40 W to heat and vaporize the water, neglecting any other heat losses. Because the flow through vaporizing tube 33 is laminar, the nebulized droplets will flow principally down the center of vaporizing tube 33 where the linear gas velocity is the greatest. It follows that the heat transfer from the heated wall of vaporizing tube 33 into the central gas flow is very inefficient, because it relies mostly on gas-phase heat transfer. Therefore, significantly higher temperatures at the wall of vaporizing tube 33 are required in order to transfer sufficient heat into the droplets. Unfortunately, the high temperature often thermally degrades the sample when the surrounding liquid is completely vaporized, thereby impeding the performance of mass spectrometer MS. On the other hand, if the heating temperature is reduced so as to avoid the deleterious effects of thermal degradation, incomplete vaporization of the sample can occur. As a consequence, non-vaporized droplets enter the ionization area, leading to problems in the ionization process and therefore inaccurate and/or uninterpretable mass analysis.

The present invention is provided to address, in whole or in part, these and other problems associated with the prior art.

SUMMARY OF THE INVENTION

In general terms, the present invention provides an apparatus and method for vaporizing a sample in a complete and uniform manner in order to optimize ionization of the sample in preparation for mass analysis thereof. The invention is particularly useful when implemented in an APCI ion source, which typically requires that the sample be vaporized by heat transfer means prior to ionization. The invention provides a gas conduit structured so as to define a flow path directed into a vaporization chamber along a vector that includes a velocity component tangential with respect to the central axis of the chamber. The gas so directed into the vaporization chamber establishes a vortex gas flow therein.

The sample is introduced into the vaporization chamber in a nebulized condition, and hence is characterized by a relatively broad, non-uniform mass (or, equivalently, size) distribution as in conventional systems. Accordingly, the nebulized sample flowing through the vaporization chamber consists of a range of large and small liquid droplets. Due to the vortex gas flow created in the vaporization chamber according to the present invention, however, the sample droplets are forced to flow toward a heated wall of the vaporization chamber. Given that force is proportional to mass, the larger droplets of the sample are subject to a greater force as compared to the smaller droplets. Thus, the larger droplets receive the greater proportion of heat energy supplied by the wall and, consequently, more energy is available for evaporating the larger droplets. At the same time, less energy is transferred to the smaller droplets. As a result, a sufficient amount of energy is available for evaporating the smaller droplets, but the energy transferred to the smaller droplets is not excessive enough to thermally degrade the analyte material of the smaller droplets. Therefore, overall vaporization of the sample is normalized, thereby optimizing subsequent ionization and mass analysis.

Moreover, because flow within the vaporization chamber is vortical, turbulent conditions within the vaporization chamber can be easily achieved, and an increase in gas flow rate will increase the capacity to vaporize all of the sample. By contrast, gas flow is laminar in conventional vaporization devices, such that a large portion of the nebulized sample flows linearly along the central axis of the vaporization space. Hence, an increase in gas flow rate in a conventional vaporization device can actually cause a decrease in its capacity to vaporize the sample due to reduced heat transfer.

Also, the present invention achieves improved vaporization without exposing the sample to potentially contaminating, catalytic, or non-inert surfaces. That is, no new surfaces or structures are added to the space where vaporization occurs. The sample does not contact the vortex-forming structures provided by the invention. The sample contacts only the inside surface of the heated wall of the vaporization chamber, which can be composed of quartz or other chemically inert material in the conventional manner. Additionally, the present invention does not reject or waste any of the sample during the sample introduction, vaporization, and nebulization processes, and accordingly is also useful for processing trace samples.

According to one embodiment of the present invention, an ion source is provided for use in mass spectrometry. The ion source comprises a chamber having a central axis, a sample conduit that includes a sample outlet communicating with the chamber, an ionizing device disposed downstream from the sample outlet, and a gas conduit that includes a gas outlet communicating with the chamber. The gas conduit defines a gas flow path directed into the chamber. The gas flow path includes a velocity component that is tangential with respect to the central axis of the chamber.

Preferably, the gas flow path also includes an axial component, and the sample flow path likewise includes an axial component, with both axial components being directed in a downstream direction through the chamber. In this manner, the gas also functions to assist in transporting the sample through the chamber.

The gas conduit in one embodiment comprises a helical channel that terminates at the gas outlet. The channel can be formed in various ways; examples are described hereinbelow. The embodiment can be structured such that the helical channel turns around a length of the sample conduit. In exemplary embodiments described in more detail hereinbelow, the helical channel is symmetrically or substantially symmetrically disposed around this length of the sample conduit. In other embodiments, the gas conduit comprises a plurality of helical channels, each of which terminates at a respective gas outlet into the chamber.

Preferably, the ion source also comprises a nebulizing fluid conduit to ensure adequate nebulization of the sample as it is introduced into the chamber. The nebulizing fluid conduit preferably includes a nebulizing fluid outlet that is adjacent and proximate to the sample outlet of the sample conduit. In embodiments described hereinbelow, the nebulizing fluid conduit is concentric to the sample outlet.

According to any of the embodiments described herein, the ion source can comprise a heating device disposed in thermal contact with the chamber that establishes a temperature gradient along the axial direction of the vaporization chamber. More heat energy is transferred to the sample at the upstream region of the chamber where more heat is needed for vaporization, and less energy is transferred at the downstream region where less heat is needed since vaporization is complete or substantially complete in the downstream region. Thus, for a heating device including an upstream end and a downstream end axially spaced from the upstream end, the thermal energy density provided by the heating device is at a substantial maximum at the upstream end and progressively reduces to a substantial minimum at the downstream end.

According to another embodiment of the present invention, an ion source for mass spectrometry comprises a vaporizing chamber having a central axis, a sample conduit including a sample outlet communicating with the chamber, a nebulizing gas conduit, and a vaporizing gas conduit. The nebulizing gas conduit includes a nebulizing gas outlet communicating with the chamber. A length of the nebulizing gas conduit is generally coaxially disposed about an axial length of the sample conduit. The vaporizing gas conduit is directed generally in a helical path about the sample conduit, and along the axial length of the sample conduit. The vaporizing gas conduit includes a vaporizing gas outlet communicating with the chamber. The vaporizing gas conduit defines a flow path directed into the chamber. The flow path includes a velocity component tangential with respect to the central axis of the vaporizing chamber.

The arrangement of the sample conduit and the nebulizing gas conduit with respect to the chamber, and particularly with respect to the central axis of the chamber, can be varied. Accordingly, in one embodiment, the respective lengths of the nebulizing gas conduit and the sample conduit are disposed along a sample introductory axis, and the sample introductory axis is substantially collinear with the central axis of the chamber. In an alternative embodiment, the sample introductory axis is generally radially offset from the central axis of the chamber. In a further alternative embodiment, the sample introductory axis is oriented at an angle with respect to the central axis of the chamber.

According to yet another embodiment of the present invention, an ion source for use in mass spectrometry comprises a vaporization chamber having a central axis, a sample conduit including a sample outlet communicating with the vaporization chamber, an ionization section disposed in flow communication with the vaporization chamber, and a vortex-forming section disposed upstream from the vaporization chamber. The vortex-forming section comprises an arcuate gas conduit that includes a gas outlet communicating with the vaporization chamber. The arcuate gas conduit defines a flow path directed into the vaporization chamber. The flow path includes a velocity component that is tangential with respect to the central axis.

A portion of the sample conduit can extend through the vortex-forming section, with the arcuate gas conduit turning around the sample conduit portion. The ion source can further comprise a nebulizing gas conduit that extends through the vortex-forming section in flow communication with the vaporization chamber.

In addition, the arcuate gas conduit can comprise a plurality of arcuate passages terminating at respective gas outlets, with each gas outlet communicating with the vaporization chamber. Each arcuate passage defines a respective gas flow path directed into the vaporization chamber through its respective gas outlet, and each gas flow path includes a velocity component tangential with respect to the central axis. Moreover, the vortex-forming section can comprise a manifold- or plenum-type structure that fluidly communicates with the arcuate passages.

The present invention also provides a method for vaporizing a sample in preparation for mass spectrometry according to the following steps. A chamber is provided that is defined by a wall radially disposed in relation to a central axis of the chamber. The chamber has an input end and an output end axially spaced from the input end. A sample is flowed into the chamber at the input end. The wall is heated to vaporize the sample. A vaporizing gas is tangentially flowed into the chamber to entrain the sample in a vortex gas flow and to thus force the sample to flow toward the heated wall, whereby vaporization of the sample is enhanced. The tangential flow can be accomplished by directing the vaporizing gas along one or more helical paths prior to introduction of the vaporizing gas into the chamber. The vaporized sample is flowed out from the chamber through the output end. The sample can then be ionized in preparation for subsequent mass analysis by mass spectrometer apparatus.

DETAILED DESCRIPTION OF THE INVENTION

Figure 1:
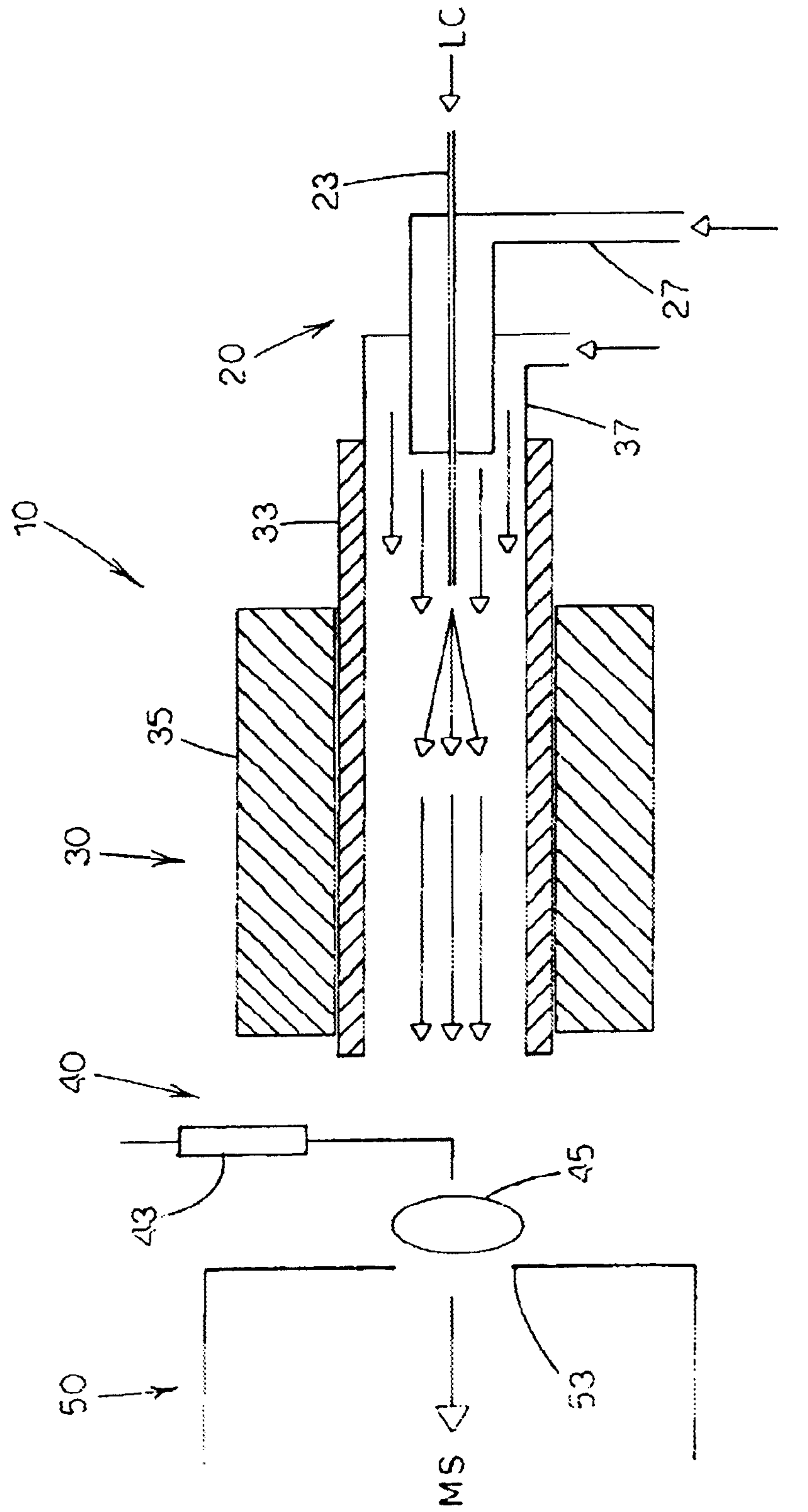
(PRIOR ART) Fig. 1
FIG. 1 is a cross-sectional, partially schematic view of a conventional APCI source.
Figure 2:
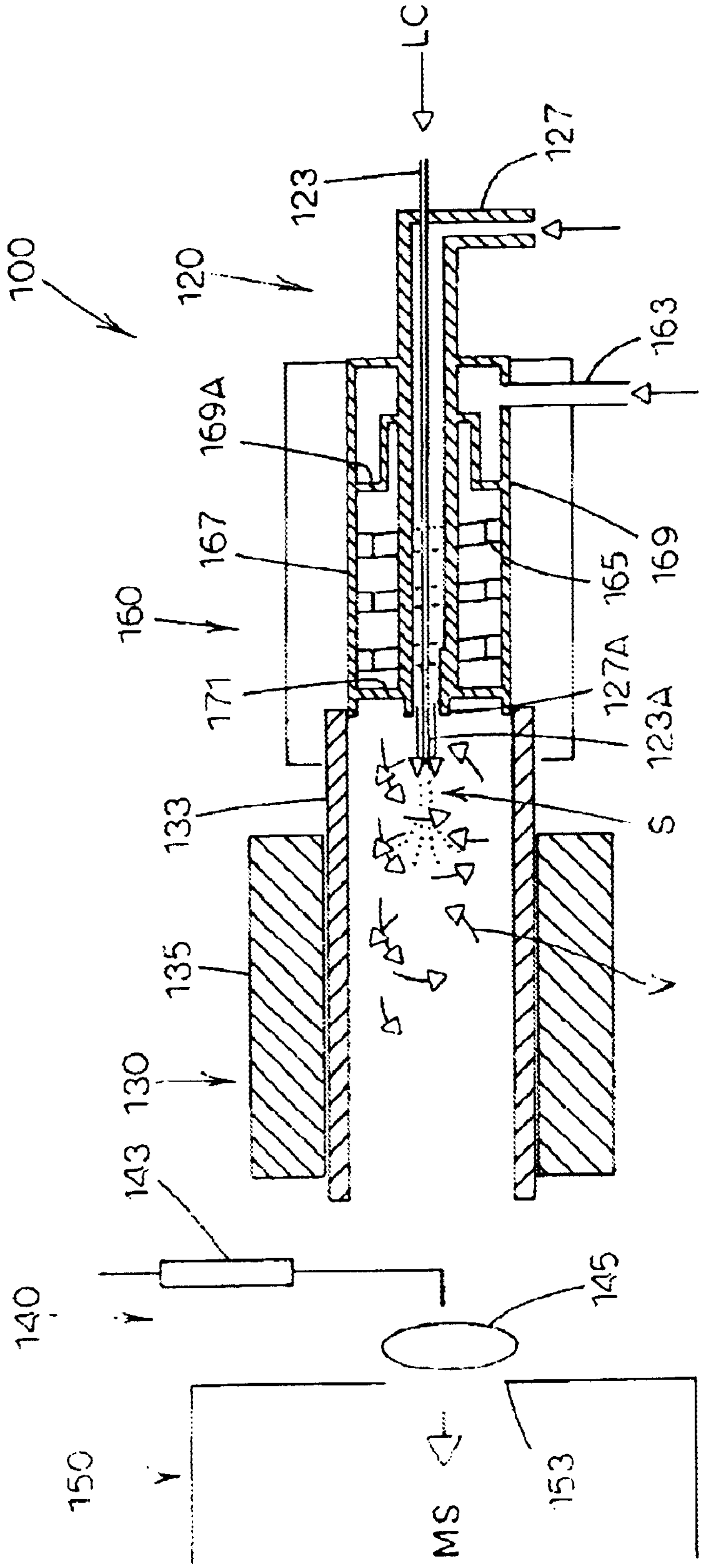
FIG. 2 is a cross-sectional, partially schematic view of an APCI source provided in accordance with one embodiment of the present invention.

Referring now to FIG. 2, an APCI source, generally designated 100, is illustrated in accordance with the present invention. APCI source 100 finds particular use as an interface between liquid chromatographic apparatus LC and the mass-analyzing, ion-detection, and other systems of mass spectrometer MS. Similar to conventional APCI source 10 illustrated in FIG. 1, APCI source 100 of the present invention comprises an inlet section, generally designated 120; a vaporization section, generally designated 130; an ionization section, generally designated 140; and an outlet section, generally designated 150, including an aperture 153 through which ionized products are directed into mass spectrometer MS. Inlet section 120 comprises a sample conduit 123, preferably in the form of a capillary tube, for introducing a sample from liquid chromatographic apparatus LC. Sample conduit 123 is disposed generally along the central axis of a vaporizing tube 133, and terminates at a sample outlet 123A for introducing the sample directly into vaporizing tube 133. Inlet section 120 also comprises a conduit 127 for directing a suitable nebulizing gas such as nitrogen into vaporizing tube 133. Nebulizing gas conduit 127 terminates at a nebulizing gas outlet 127A positioned so as to conduct nebulizing gas into vaporizing tube 133 in the proximity of the point of entry of the sample emitted from sample conduit 127 so as to efficiently nebulize the sample. The nebulized sample entering vaporizing tube 133 is generally indicated in FIG. 2 by droplets S.

Nebulization is preferably accomplished by positioning nebulized gas outlet 127A concentrically around sample outlet 123A of sample conduit 123.

Vaporization section 130 comprises a structure suitable for defining an interior space through which the nebulized sample can travel to ionization section 140 and be vaporized prior to reaching ionization section 140. Accordingly, FIG. 2 illustrates a vaporizing space-defining structure provided in the form of vaporizing tube 133, although the invention is not limited to providing a tube-like or cylindrical profile. Vaporization section 130 further comprises a heater 135 disposed in thermal contact with the wall of vaporizing tube 133. Similar to the conventional system illustrated in FIG. 1, ionization section 140 of APCI source 100 generally includes an enclosed chamber (not specifically shown) into which a corona needle 143 or other equivalent point-charge supply means is inserted to strike a low-current corona discharge 145 within ionization section 140.

In accordance with the present invention, APCI source 100 further comprises a vortex-forming section, generally designated 160, that is disposed upstream of vaporizing section 130. Preferably, a length of sample conduit 123 extends through vortex-forming section 160 generally along the central axis of vaporizing tube 133, and a length of nebulizing gas conduit 127 extends through vortex-forming section 160 in coaxial relation to the length of sample conduit 123. Vortex-forming section 160 contains a significant portion of a conduit 163 for directing a suitable auxiliary vaporizing gas such as nitrogen into vaporizing tube 133. Vaporizing gas conduit 163 is structured so as to conduct vaporizing gas into vaporizing tube 133 along a flow vector having a significant tangential velocity component, thereby producing vortices of the sample and gases in vaporization section 130 as indicated by arrows V. This is accomplished by providing a significant length of vaporizing gas conduit 163 in the form of one or more vortex-forming channels 165 disposed within vortex-forming section 160.

Vortex-forming channels 165 constitute a series of spiral or helical passages that run in the direction toward vaporization section 130, along a number of turns symmetrically or substantially symmetrically around the length of sample conduit 123 and/or around the central axis of vaporization section 130. Vortex-forming channels 165 can be realized in many configurations. For example, vortex-forming channels 165 can be provided in the form of tubes soldered to, welded to, or otherwise supported by a coaxial inside surface 167 of vortex-forming section 160. Alternatively, vortex-forming channels 165 can be formed by a multi-start threaded rod- or tube-like structure that is press-fitted against inside surface 167 of vortex-forming section 160. The cross-section of each vortex-forming channel 165 can be rectilinear as illustrated in FIG. 2, or can be circular or elliptical, or can have other shapes. In order to accommodate more than one vortex-forming channel 165, a portion of vaporizing gas conduit 163 immediately upstream of vortex-forming channels 165 can be structured as a manifold or plenum 169, which is illustrated in FIG. 2 as being housed within vortex-forming section 160 in coaxial relation to the central axis. Although not specifically shown, a downstream surface 169A of manifold 169 includes entrance apertures leading into respective vortex-forming channels 165. Similarly, an interfacial surface 171 between vortex-forming section 160 and vaporization section 130 includes a corresponding number of exit apertures (not specifically shown) through which the vaporizing gas streams from each vortex-forming channel 165 pass into vaporizing tube 133 tangentially with respect to the central axis.

The auxiliary vortex gas flow is formed in vaporization section 130 by forcing the gas through vortex-forming channel 165 or the series of vortex-forming channels 165. The vortex gas flow causes a centrifugal force to be exerted on each droplet that is a function of the mass (i.e., the diameter) of the droplet. Thus, a greater force is imparted to the larger droplets, and a lesser force is imparted to the smaller droplets. Because the gas exiting vortex-forming channels 165 has a significant tangential velocity component, the droplets of the sample are forced against the heated wall of vaporizing tube 133. This increases the time of contact of the droplets with the heated wall and the amount of heat energy transferred to the droplets from the heated wall. The advantage of the vortex gas flow is especially important in the case of the larger droplets, which require a greater input of latent heat energy in order to change phase. The greater force imparted to the larger droplets ensures that they are subject to a greater amount of heat transfer, as compared to the smaller droplets that do not require as much latent heat energy to change phase. In other words, the lesser force imparted to the smaller droplets reduces the risk that the amount of heat energy applied to them exceeds the latent heat energy serving to effect the conversion from liquid phase to vapor phase. According to heat transfer principles, excessive heat energy would be of the “sensible” type that could raise the temperature of the analyte constituents of the vaporized (or vaporizing) smaller droplets, and thereby possibly result in thermal degradation or decomposition of the analytes.

The effect of the vortex gas flow can also be explained as counteracting a phenomenon, often termed the Leidenfrost effect, by which an insulating vapor barrier develops between a heated surface and a colder wet object such as a liquid droplet that reduces the rate of heat exchange from the heated surface to the droplet. As a general matter, if the surface is heated to a certain temperature above the boiling point of the droplet (known as the Leidenfrost point), complete vaporization of the droplet will not occur. Instead, the portion of the surface of the droplet closest to the heated surface almost immediately vaporizes, thereby creating the insulating vapor barrier between the droplet and the heated surface. The gas pressure from this vapor barrier prevents the remaining portion of the droplet from contacting the heated surface, and accordingly the rate of vaporization is significantly slowed as it is known that vapor cannot transfer heat as well as a thermally conductive solid. Due to expansion of the vapor barrier, the droplet can even be repelled away from the heated surface, again resulting in a decrease in the amount of heat energy transferred to the droplet. Even if Leidenfrost conditions are not met, expanding gases can still function as reaction forces that repel droplets. The vortex flow created according to the present invention, however, ensures that droplets are forced into sufficient contact with the wall of vaporization tube such that vaporization is not impeded.

As an example of the operation of the present invention, if a vaporizing gas flows at 3000 ml/min through three vortex-forming channels 165 each having a cross-sectional area of 0.75 mm×0.5 mm, the average linear gas velocity (V) at the exit will be approximately 44 m/sec. This tangential velocity will produce an apparent centrifugal force (F) on a liquid droplet of $F=mV^2/r$, where (m) is the mass of the droplet and (r) is the radius of vaporizing tube 133 in which the gas spirals. A 1-micron diameter droplet of water will have a mass of $1.67\times10^{-16}$ kg. If this droplet is moving at 44 m/sec. in a 6-mm I.D. vaporizing tube 133, the force imparted on the droplet will be $1.1\times10^{-10}$ N. This assumes that the helix angle (i.e., the angle that each vortex-forming channel 165 makes with respect to the plane perpendicular to the central axis) is zero. In fact the actual helix angle will be greater than zero, depending on how many vortex-forming channels 165 are interleaved. For three vortex-forming channels 165, the helix angle will be approximately 4.5 degrees. Therefore, the actual tangential velocity will be 44 cos(4.5). For comparison, the gravitational force on the same droplet is $F_g=mg$; where (m) is the mass and (g)=9.8 m/sec$^2$. Thus, $F_g=1.63\times10^{-15}$ N. Therefore, the force on the droplet from the motion of the gas is $6.7\times10^4$ times larger than the force on the droplet due to gravity. In addition, it should be noted that the force is proportional to the mass, which in turn is proportional to the cube of the diameter of the droplet. Therefore, the larger-diameter droplets will experience a larger force against the heated wall of the vaporizing tube, thereby preferentially increasing the heat transfer. In this manner, the initial distribution of droplet sizes is re-normalized into a smaller, more uniform distribution of droplet sizes, thereby optimizing ionization and subsequent detection and analysis.

The operation of APCI source 100 is otherwise similar to conventional APCI sources such as APCI source 10 illustrated in FIG. 1. The liquid sample from an LC column is introduced into heated vaporization tube 133 via sample conduit 123. A nebulizing gas stream is introduced into vaporization tube 133 through nebulizing gas conduit 127 in concentric relation to the sample flow, thereby nebulizing the liquid sample into small liquid droplets. As described hereinabove, the vaporizing gas stream or streams are forced through vaporizing gas conduit 163 along a helical path or paths defined by vortex-forming channels 165 of vortex-forming section 160, such that the vaporizing gas is introduced into vaporizing tube with a significant tangential velocity component. Thus, the vaporizing gas not only assists in transporting the liquid droplet and vapor phases of the sample through vaporizing tube 133, it also ensures sufficient interaction with the heated wall of vaporization tube 133 and consequently sufficient heat exchange as described hereinabove. Subsequently, the vaporized sample and mobile phase pass into low-current corona discharge 145 and chemical ionization is effected in preparation for introducing the sample into the mass analyzer of mass spectrometer MS.

Figure 3A:
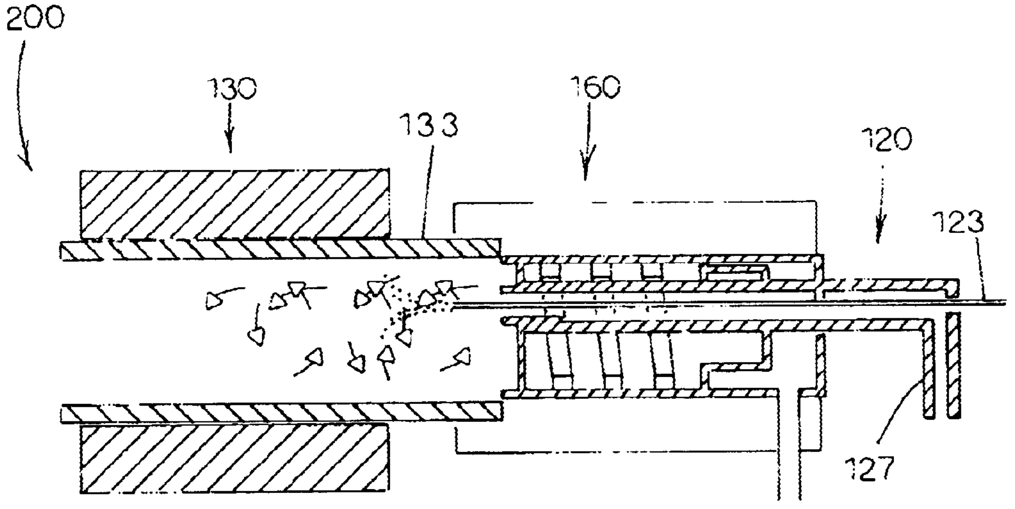
FIG. 3A is a cross-sectional view of an APCI source provided in accordance with an alternative embodiment of the present invention, wherein the sample is introduced along an axis offset from the central axis of the vaporizing tube.
Figure 3B:
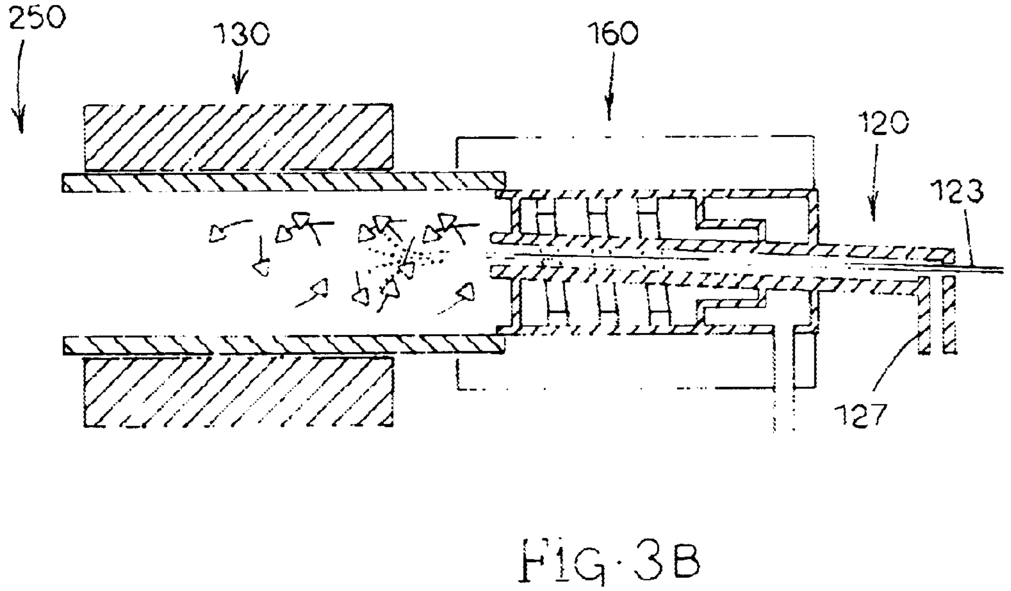
FIG. 3B is a cross-sectional view of an APCI source provided in accordance with another alternative embodiment of the present invention, wherein the sample is introduced along an axis angled with respect to the central axis of the vaporizing tube.
Figure 4:
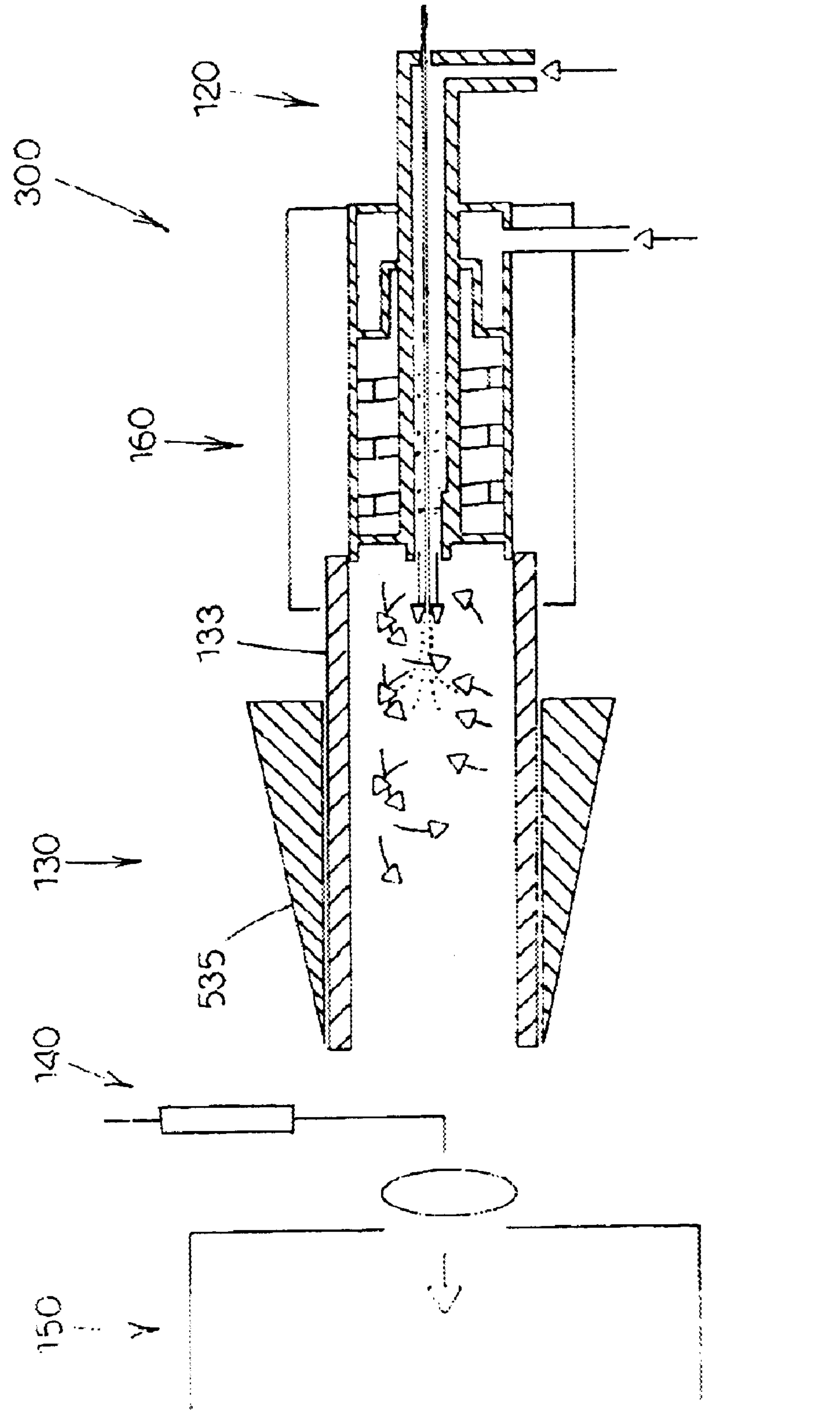
FIG. 4 is a cross-sectional view of an APCI source provided in accordance with yet another alternative embodiment of the present invention, wherein the heater is configured so as to produce a temperature gradient along the axial direction of the vaporizing tube.

FIGS. 3A, 3B and 4 illustrate alternate embodiments of the invention. In FIG. 3A, an APCI source, generally illustrated 200, is configured such that the axis of sample introductory flow along which sample conduit 123 and nebulizing gas conduit 127 are disposed is radially displaced from the central axis of vaporizing tube 133. In FIG. 3B, an APCI source, generally illustrated 250, is configured such that the axis of sample introductory flow along which sample conduit 123 and nebulizing gas conduit 127 are disposed is oriented at an angle with respect to the central axis of vaporizing tube 133. The embodiments of FIGS. 3A and 3B both introduce the sample droplets more directly into the high velocity gas flow provided by vortex-forming section 160. In FIG. 4, an APCI source, generally illustrated 300, is configured so as to produce a temperature gradient along the length of vaporizing tube 133. This is accomplished in effect by providing a heater 535 with a triangular shape. The watt density of heater 535 is greater at the beginning of vaporizing tube 133 where a greater amount of heat energy input is needed, and becomes progressively smaller along the axial length of vaporizing tube 133 toward the exit end of vaporizing tube 133 where the droplet sizes are more uniform and the droplets and sample can be totally vaporized. The triangular shape of heater 535 is illustrated schematically, and hence it will be understood that the decreasing temperature gradient can be accomplished in numerous ways. As a non-limiting example, heater 535 can comprise a dissipative heating wire that is wound around vaporization tube 133 with the number of turns/length varying to change the watt density.

Figure 5:
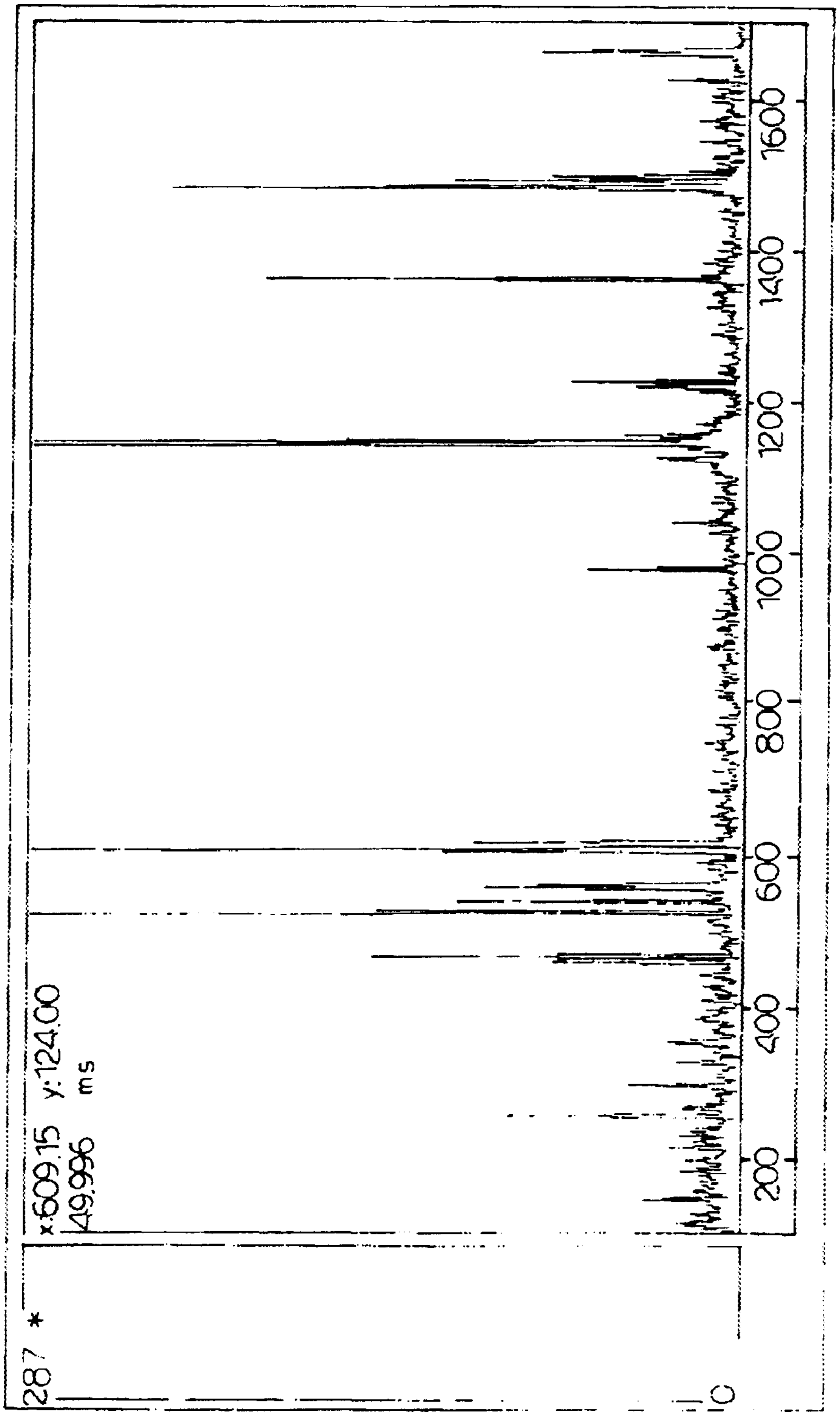
FIG. 5 illustrates a mass spectrum produced by a mass spectrometer using the APCI source of the present invention.
Figure 6:
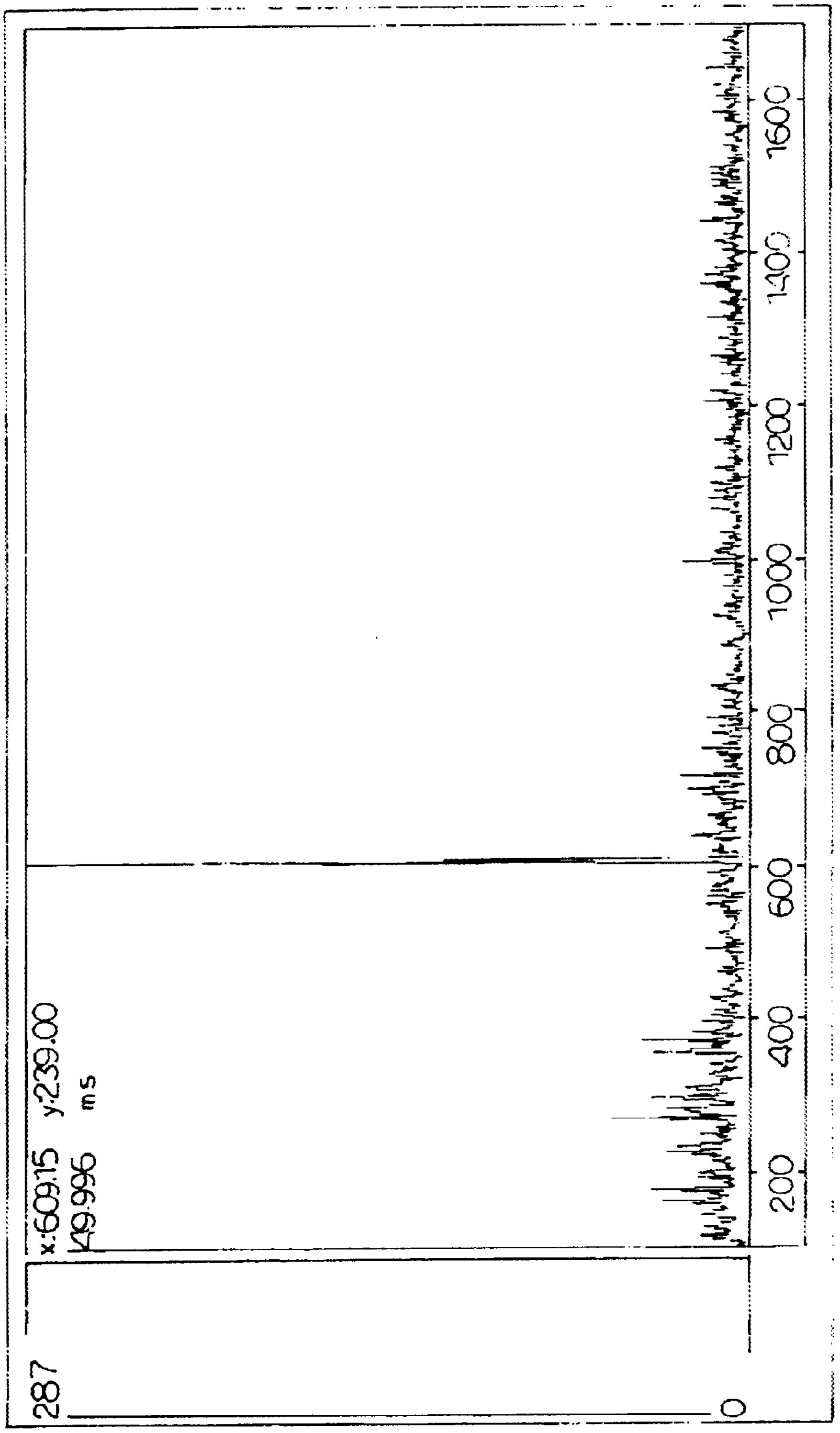
FIG. 6 illustrates a mass spectrum produced by a mass spectrometer using the APCI source of the present invention at an increased gas flow rate as compared to the results shown in FIG. 5.

It can therefore be seen that a primary advantage of the invention according to any of the embodiments described hereinabove is improved heat transfer to the sample droplets flowing through vaporizing tube 133 and, consequently, improved vaporization of the droplets. The invention thus serves to reduce noise spikes in the mass spectrum produced by a mass spectrometer that are caused by droplets not being completely vaporized. In prior art devices, the flow through the vaporizing tube is laminar, so that increasing the gas flow actually reduces the residence time of the droplets in the vaporizing tube (e.g., vaporizing tube 33 in FIG. 1), and therefore increases the number of non-vaporized droplets exiting the vaporizing tube and entering the mass analyzer. By comparison, the advantage provided by the present invention can be seen by considering the plots of mass spectra reproduced in FIGS. 5 and 6. FIG. 5 depicts a mass spectrum containing a sample of reserpine (m/z=609) with a flow rate of 700 ml/min of auxiliary gas flow in APCI source 100 of the present invention (see FIG. 2). This flow rate is too low to effectively force the droplets against the heated wall of vaporization tube (see FIG. 2). FIG. 6, however, shows the effect of increasing the gas flow to 2400 ml/min. Noise due to non-vaporized droplets entering the mass analyzer has been eliminated by more complete vaporization due to turbulence created by the increased vortex gas flow and the improved heat transfer as described hereinabove.

It will be understood that various details of the invention may be changed without departing from the scope of the invention. Furthermore, the foregoing description is for the purpose of illustration only, and not for the purpose of limitation—the invention being defined by the claims.

What is claimed is:

1. An ion source for use in mass spectrometry, comprising:

(a) a chamber having a central axis;

(b) a sample conduit including a sample outlet communicating with the chamber;

(c) an ionizing device disposed downstream from the sample outlet; and (d) a gas conduit including a gas outlet communicating with the chamber, wherein the gas conduit defines a gas flow path directed into the chamber and comprising a velocity component tangential with respect to the central axis.

2. The ion source according to claim 1, wherein the sample conduit defines a sample flow path including an axial velocity component in a downstream direction through the chamber, and the gas flow path comprises an axial velocity component in the downstream direction through the chamber.

3. The ion source according to claim 1, wherein the gas conduit comprises a helical channel terminating at the gas outlet.

4. The ion source according to claim 3, wherein the helical channel turns around a length of the sample conduit.

5. The ion source according to claim 1, wherein the gas conduit comprises a plurality of gas outlets communicating with the chamber and defines a plurality of respective gas flow paths directed into the chamber, each gas flow path directed through a respective gas outlet and comprising a velocity component tangential with respect to the central axis.

6. The ion source according to claim 5, wherein the gas conduit comprises a plurality of helical channels terminating at the respective gas outlets and each helical channel turns around a length of the sample conduit.

7. The ion source according to claim 1, comprising a nebulizing fluid conduit including a nebulizing fluid outlet disposed adjacent and proximate to the sample outlet in communication with the chamber.

8. The ion source according to claim 1, comprising a heating device disposed in thermal contact with the chamber, the heating device including an upstream end and a downstream end axially spaced from the upstream end, wherein a thermal energy density provided by the heating device is at a maximum at the upstream end and progressively reduces to a minimum at the downstream end.

9. An ion source for use in mass spectrometry, comprising:

(a) a vaporizing chamber having a central axis;

(b) a sample conduit including a sample outlet for flowing a sample into the chamber;

(c) a nebulizing gas conduit including a nebulizing gas outlet communicating with the chamber, wherein a length of the nebulizing gas conduit is generally coaxially disposed about a length of the sample conduit; and (d) a vaporizing gas conduit directed generally in a helical path about the sample conduit and along an axial length of the sample conduit, the vaporizing gas conduit including a vaporizing gas outlet communicating with the chamber, wherein the vaporizing gas conduit defines a flow path directed into the chamber and including a velocity component tangential with respect to the central axis.

10. The ion source according to claim 9, wherein the respective lengths of the nebulizing gas conduit and the sample conduit are disposed along a sample introductory axis, and the sample introductory axis is substantially collinear with the central axis of the chamber.

11. The ion source according to claim 9, wherein the respective lengths of the nebulizing gas conduit and the sample conduit are disposed along a sample introductory axis, and the sample introductory axis is generally radially offset from the central axis of the chamber.

12. The ion source according to claim 9, wherein the respective lengths of the nebulizing gas conduit and the sample conduit are disposed along a sample introductory axis, and the sample introductory axis is oriented at an angle with respect to the central axis of the chamber.

13. An ion source for use in mass spectrometry, comprising:

(a) a vaporization chamber having a central axis;

(b) a sample conduit including a sample outlet communicating with the vaporization chamber;

(c) an ionization section disposed in flow communication with the vaporization chamber;

(d) a vortex-forming section disposed upstream from the vaporization chamber and comprising an arcuate gas conduit, the arcuate gas conduit including a gas outlet communicating with the vaporization chamber, wherein the arcuate gas conduit defines a flow path directed into the vaporization chamber and including a velocity component tangential with respect to the central axis.

14. The ion source according to claim 13, wherein a portion of the sample conduit extends through the vortex-forming section, and the arcuate gas conduit turns around the sample conduit portion.

15. The ion source according to claim 14, comprising a nebulizing gas conduit extending through the vortex-forming section in flow communication with the vaporization chamber.

16. The ion source according to claim 13, wherein the arcuate gas conduit comprises a plurality of arcuate passages terminating at respective gas outlets, each gas outlet communicating with the vaporization chamber, wherein each arcuate passage defines a respective gas flow path directed into the vaporization chamber through its respective gas outlet, and each gas flow path includes a velocity component tangential with respect to the central axis.

17. The ion source according to claim 16, wherein the vortex-forming section comprises a manifold fluidly communicating with the plurality of arcuate passages.

18. A method for vaporizing a sample in preparation for mass spectrometry, comprising the steps of:

(a) providing a chamber defined by a wall radially disposed in relation to a central axis of the chamber, wherein the chamber has an input end and an output end axially spaced from the input end;

(b) flowing a sample into the chamber at the input end;

(c) heating the wall to vaporize the sample;

(d) flowing a vaporizing gas tangentially into the chamber to entrain the sample in a vortex gas flow and force the sample to flow toward the heated wall, whereby vaporization of the sample is enhanced; and (e) ionizing the vaporized sample by flowing the vaporized sample out from the chamber through the output end.

19. The method according to claim 18, wherein the step of flowing the vaporizing gas tangentially into the chamber comprises the step of directing the vaporizing gas along a helical path prior to entry into the chamber.

20. The method according to claim 18, wherein the wall of the chamber is heated according to a temperature gradient that has a maximum value proximate to the input end of the chamber and reduces to a minimum value proximate to the output end.

21. The ion source according to claim 13 wherein the ionization section is disposed downstream from the sample outlet.

22. An ionization interface for use in mass spectrometry, comprising:

(a) a chamber for vaporizing a sample, the chamber having a central axis;

(b) a sample conduit comprising a sample outlet for flowing a sample into the chamber;

(c) an ionizing device disposed downstream from the sample outlet for ionizing the sample; and (d) a gas conduit comprising a gas outlet communicating with the chamber, the gas conduit defining a gas flow path directed into the chamber and comprising a velocity component tangential relative to the central axis for enhancing vaporization of the sample.

23. The ionization interface according to claim 22 wherein the sample conduit defines a sample flow path comprising an axial velocity component in a downstream direction through the chamber, and the gas flow path comprises an axial velocity component in the downstream direction through the chamber.

24. The ionization interface according to claim 22 wherein at least a portion of the gas conduit turns around a length of the sample conduit in a helical manner.

25. The ionization interface according to claim 22 wherein the chamber comprises wall, and the ionization interface further comprises a heating device disposed in thermal contact with the wall.

26. An ionization interface for use in mass spectrometry, comprising:

(a) a chamber having a central axis;

(b) a sample conduit comprising a sample outlet, the sample conduit defining a sample flow path including a sample axial velocity component in a downstream direction through the chamber;

(c) an ionizing device disposed downstream from the sample outlet; and (d) a gas conduit comprising a gas outlet, the gas conduit defining at the gas outlet a gas flow path comprising a gas axial velocity component in the downstream direction through the chamber and a tangential velocity component tangential relative to the central axis.

27. The ionization interface according to claim 26 wherein at least a portion of the gas conduit turns around a length of the sample conduit in a helical manner.

28. The ionization interface according to claim 26 wherein the chamber comprises a wall, and the ionization interface further comprises a heating device disposed in thermal contact with the wall.

29. An ionization interface for use in mass spectrometry, comprising:

(a) a chamber having a central axis and comprising a heatable wall;

(b) a sample conduit including a sample outlet communicating with the chamber;

(c) an ionizing device disposed downstream from the sample outlet; and (d) a gas conduit including a gas outlet communicating with the chamber, the gas conduit defining a gas flow path directed into the chamber and comprising a velocity component tangential relative to the central axis for forcing sample-containing droplets in the chamber into heat-transferring contact with the heatable wall.

30. The ionization interface according to claim 29 wherein the sample conduit defines a sample flow path including an axial velocity component in a downstream direction through the chamber, and the gas flow path comprises an axial velocity component in the downstream direction through the chamber.

31. The ionization interface according to claim 29 wherein at least a portion of the gas conduit turns around a length of the sample conduit in a helical manner.

32. The apparatus according to claim 29 comprising a heating device disposed in thermal contact with the wall.

* * * * *